United States Patent [19]
Vedova

[11] 3,748,854
[45] July 31, 1973

[54] LIFT ENGINE

[75] Inventor: Ralph Vedova, Munich, Germany

[73] Assignee: Motoren-und Turlinen-Union Munich GmbH, Munich, Germany

[22] Filed: Sept. 24, 1971

[21] Appl. No.: 183,367

[30] Foreign Application Priority Data
Sept. 29, 1970 Germany.............. P 20 47 781.0

[52] U.S. Cl......... 60/226 R, 60/39.18 C, 244/23 R, 417/409
[51] Int. Cl............................................... F02k 3/04
[58] Field of Search .................. 60/226 R, 39.18 C; 244/12 A, 12 B, 23 B, 23 R; 417/409

[56] References Cited
UNITED STATES PATENTS
2,677,932   5/1954   Forsling............................ 417/409
2,899,149   8/1959   Breguet............................. 60/226 R
3,263,416   8/1966   Bill................................... 60/226 R
3,335,976   8/1967   Kappus............................. 60/226 R
3,680,316   8/1972   Pakendorf......................... 60/39.31

FOREIGN PATENTS OR APPLICATIONS
1,002,462   8/1965   Great Britain.................... 60/226 R Primary Examiner—Douglas Hart
Attorney—Craig, Antonelli & Hill

[57] ABSTRACT

A lift engine assembly for aircraft capable of producing lift and/or thrust having a tip turbine operated lift fan with at least one gas turbine engine being arranged about the circumference of the lift fan.

21 Claims, 5 Drawing Figures

INVENTOR
RALPH VEDOVA

BY Craig, Antonelli & Hill

ATTORNEYS

INVENTOR
RALPH VEDOVA

BY Craig, Antonelli & Hill
ATTORNEYS

LIFT ENGINE

The present invention relates to an aircraft lift engine having a tip turbine operated lift fan.

A known type of aircraft lift fan is disclosed in German Patent 1092311, wherein the lift fan is fitted with a circumferentially extending row of turbine blades for driving the fan by power from the hot gases expanded by the actual cruise or propulsion engine and drawn through suitable connecting ducting. This particular arrangement is therefore wholly reliant on the action of the cruise engine, and requires extensive hot-gas ducting and associated flow control apparatus with attendent problems in terms of weight and materials utilized. In addition, the dependency of the lift fan on the cruise engine for its sole source of power detracts from the safety of the aircraft in flight.

Another disadvantage of this type of lift fan is that the circumferential turbine blades on the lift fan must be fabricated at great expense from highly heat-resistant materials and made of a size capable of withstanding the hot gases, which does not aid in obtaining a favorable thrust weight ratio.

Other known arrangements utilize axial-flow bypass engines for producing VTOL lift thrust. Lift engines such as these are commonly constructed in a twin-spool arrangement in which a low-pressure fan stage discharges a portion of its percompressed air into the internal gas generator while the remaining portion produces most of the total lift thrust. This type of engine provides a thrust weight ratio on the order of 16:1 to 20:1 if not greater. Such ratios are achieved by incorporating lightweight metals and, especially, fiber-reinforced plastics as structural materials in the low-pressure fan stage and the first stages in the high-pressure compressor. Use is also made of improved temperature-resistant materials and special blade cooling provisions in the hot-gas area. However, the primary disadvantage of this type of lift engine is its large axial size which prevents the installation in flat aircraft spaces, such as in the wing, and confines the installation to the fuselage or externally carried nacelles.

In lift engines having a lift fan and a central gas generating section, the requirement for maximum flatness in construction compels the exclusive or partial use of an essentially radial-flow compressor and/or turbine stages. However, the problems in transferring hot gases from the central generating section past the fan blades and to the tip turbine blades are numerous, and the close contiguity of parts in the hot gas stream and the cold air stream brings dissimilar materials together and promotes thermal stresses in the components skirted by flows of divergent temperatures. It can thus be appreciated that such an engine will be expensive to fabricate, especially since the use of hot gases for impelling the tip turbine necessitates the incorporation of highly heat-resistant materials in the turbine blades, resulting in a relatively high deadweight for the entire lift engine.

These disadvantages are eliminated according to the present invention in that the lift engine assembly is divided into a lift fan section which, together with its tip turbine, is supplied only with air, and into a gas turbine section whose hot-gas generating components do not communicate with the lift fan section, even though each lift engine assembly is considered an independent unit.

In accordance with one feature of the present invention, a lift fan having one or more gas turbine engines at its circumference constitutes a self-sustained lift engine assembly fully operable in complete independence of any cruise engine provided on the aircraft.

In accordance with another feature of this invention, a plurality of gas turbine engines powering the lift fan are provided to ensure a high degree of safety in flight, i.e., several engines being present in the event that one of the gas trubine engines fails during flight.

It is further a feature of the present invention that the lift engine assembly provides maximum latitude in the lift fan design, especially regarding the fan diameter and use of materials to promote optimum thrust weight ratios. Characteristically, the lift fan blades, as well as the tip turbine, can be made of fiber reinforced plastics. Similarly, the fan blades and the tip turbine blades can be constructed as single pieces.

In accordance with still a further feature of this invention, the gas turbine engines of the lift engine assembly can be designed for independently producing lift and/or thrust while simultaneously supplying air under pressure to the lift fan.

It is therefore an object of the present invention to provide a lift engine assembly incorporating a tip-turbine operated lift fan, in which the disadvantages of the prior art arrangements are eliminated and which is characterized by a flat construction which permits the installation in the wings of aircraft as well as any other desired area.

It is another object of this invention to provide a lift engine assembly having a favorably thrust weight ratio.

It is a further object of this invention to provide a lift engine assembly with a comparatively large size lift fan for high mass flows, in which the lift fan, its tip turbine and other components can be constructed of lightweight materials.

It is yet a further object of this invention to provide a lift engine assembly with at least one gas turbine engine at the outer circumference of the lift fan for supplying the tip turbine with compressed air.

These and other objects, features and advantages of the present invention will become more obvious from the following description when taken in connection with the accompanying drawings, wherein.

Figure 1:
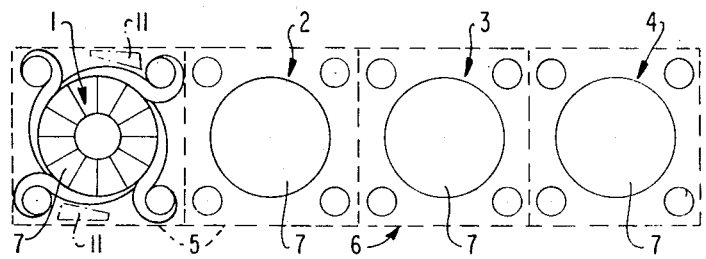
FIG. 1 is a plan view and illustrates an embodiment of the lift engine assembly according to the present invention and a plural engine configuration therefor.

Referring now to the drawings wherein like reference numerals are used throughout the various views to designate like parts and more particularly to FIG. 1, there is provided, in accordance with the present invention, a plurality of lift engines 1, 2, 3 and 4, each requiring a square installation area 5, shown in dashed line, which engines can be arranted to form a rectangular configuration 6, also shown in dashed line. It is readily apparent that due to the square installation area of each of engines 1, 2, 3 and 4, the engines could be arranged to also provide a square configuration.

Figure 4:
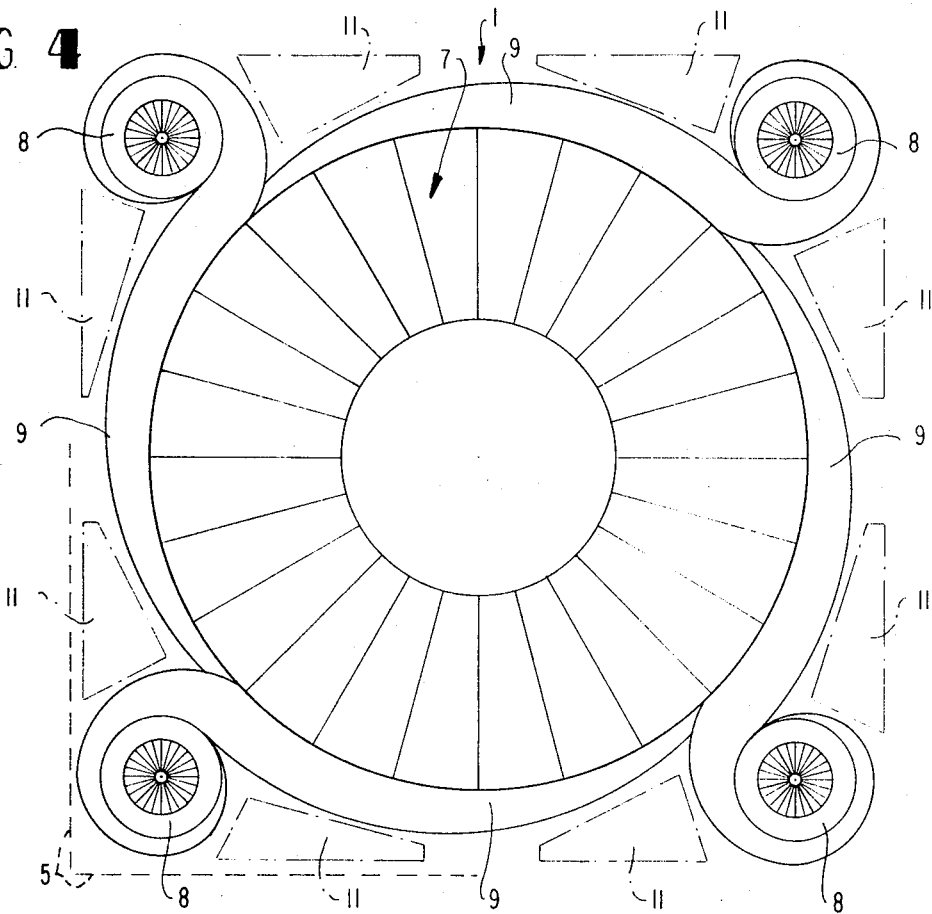
FIG. 4 is an enlarged plan view of the lift engine assembly of FIG. 1.
Figure 5:
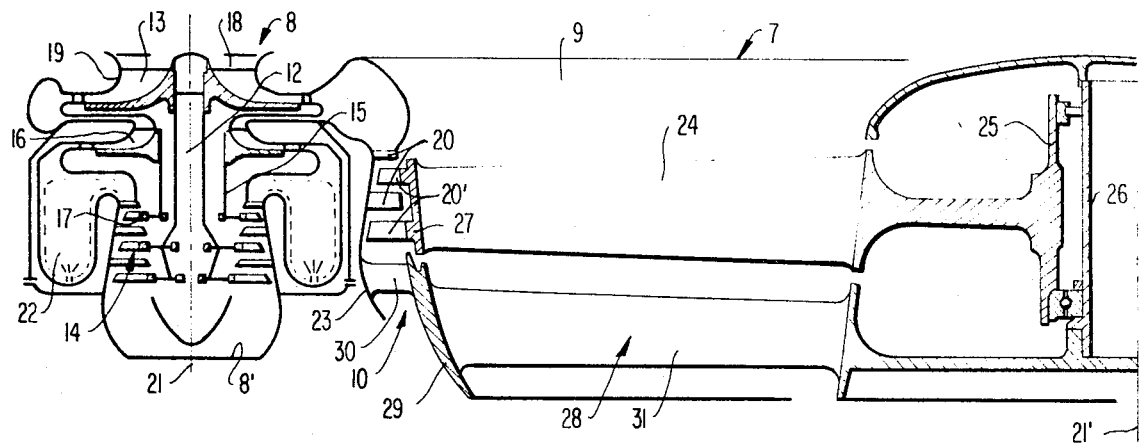
FIG. 5 is a detailed schematic sectional view illustrating a gas trubine engine for powering a lift fan with the right lift engine half broken away for clarity.

As shown in FIG. 4, which is an enlarged plan view of engine assembly of FIG. 1, the engine assembly includes a large diameter central lift fan 7 jointly driven by, for example, four equidistant power units 8 such as alike gas turbine engines which supply tip turbine 10 of lift fan 7, shown in FIG. 5, with air under pressure channeled through spiral inlet ducts 9. The space not occupied within the installation square 5 by fan 7 and gas turbine engines 8 can be utilized to accommodate auxiliary drives 11, shown in dashed line, such as pumps or actuating cylinders for servicing the gas turbine engines 8 or air motors for opening or closing doors over the lift fan inlet or outlet openings in the aircraft wing. Additionally, the unoccupied space around fan 7 can be at least partially utilized for housing fuel or oil tanks.

Referring to FIG. 5, each gas turbine 8 is shown as a twin-spool arrangement with an inner shaft 12 having a radial-flow low-pressure fan wheel 13 and downstream therefrom, a two-stage axial-flow low-pressure turbine 14 to drive low-pressure fan wheel 13 seated thereon. The gas turbine engine 8 also includes a hollow shaft 15 coaxial with inner shaft 12 which carries radial-flow high-pressure fan wheel 16 downstream of low-pressure fan wheel 13. Also attached to the hollow shaft 15 is an axial-flow high-pressure turbine wheel 17 driving high-pressure fan wheel 16.

In operation, the low-pressure fan wheel 13 draws in outside air through an intake 18 in a compressor casing 19 and discharges air under pressure to the lift fan 7 through the spiral inlet duct 9. The air issuing from duct 9 impinges on guide vanes 20 and rotor blades 20' of the tip turbine 10 which forms a part of the lift fan 7. A portion of the air discharged by the low-pressure fan wheel 13 is not exhausted to the tip turbine 10 through inlet duct 9, but is passed for further compression through high-pressure fan wheel 16, and into a reverse-flow combustion chamber 22 which extends in line with the longitudinal centerline 21 of the gas turbine engine 8. In the reverse-flow combustion chamber 22, fuel is added to the compressed air and the resultant mixture is then burned to drive high-pressure turbine 17 and low-pressure turbine 14, in that order. Thus, the gas trubine engine shown in FIG. 5 simultaneously produces lift and thrust, and includes an arrangement for permitting the engine exhaust gases to exit vertically downward through an outlet 8'. The exhaust gases can also be utilized for pressurizing tip turbine 10 associated with the lift fan 7. As shown in the drawings, lift fan 7 essentially comprises fan blades 24, which are rotatably mounted inside shroud 23 with rotary blades 20' of the tip turbine 10 being arranged at the tips of the blades 24. The fan blades 24 are journaled about trunnion 26 through a hollow shaft 25. The airflow through the tip turbine 10 is seperated from the portion through lift fan 7 by webs 27 between fan blades 24 and turbine blades 20'. The fan blades 24 draw in outside air and discharge the air into an annular duct 28 formed by a cylindrical casing 29 which extends downward from the webs 27 as a continued partition between the respective airflows through tip turbine 10 and lift fan 7. Both the tip turbine 10 and the lift fan 7 are provided with guide vanes 30 and 31, respectively, which also serve as structural support members.

Figure 2:
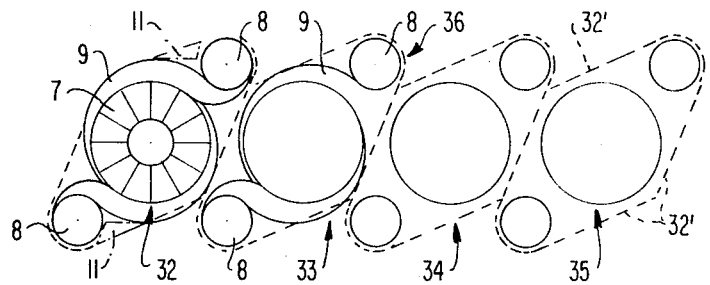
FIG. 2 is a plan view and illustrates an alternative embodiment of the lift engines and a plural engine configuration therefor in constellation.
Figure 3:
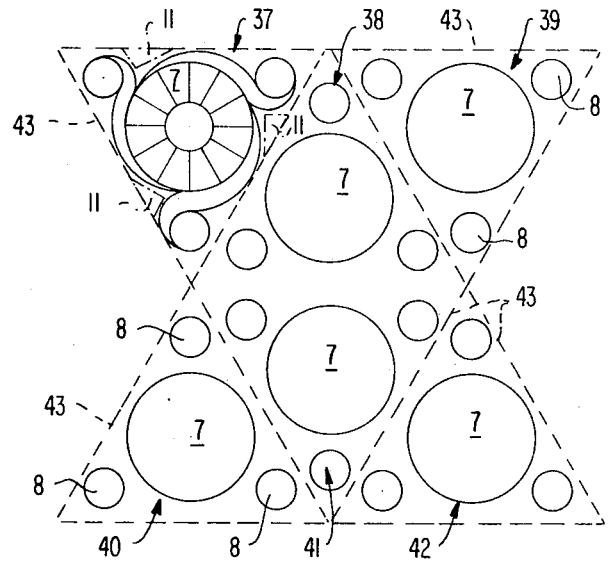
FIG. 3 is a plan view and illustrates another alternative embodiment of the lift engines and a plural engine configuration therefor.

Referring to FIGS. 2 and 3, these figures disclose other lift engine assembly arrangements in accordance with the present invention. Thus, FIG. 2 discloses a lozenge-shaped arrangement for lift engines 32, 33, 34 and 35 forming a group configuration 36. However, unlike the lift engine of FIG. 1, there are only two power units 8 at the circumference of each lift fan 7, whereas the transverse distances between gas turbine engines 8 of the lift engine in both figures are the same. In FIG. 3, each of the lift engine assemblies 37, 38, 39, 40, 41 and 42 is provided with a triangular installation area 43 to form an approximately X-shaped grouping configuration. The lift engines having a triangular installation area 43 can of course be added where required depending upon available space. It is readily apparent that the operation of the lift engines of FIGS. 2 and 3 is similar to the lift engine of FIG. 5.

The various described embodiments of the present invention show that for any given lift engine installation area, gas turbine engines 8 are disposed around lift fan 7 in accordance with the specific space requirements. Accordingly, one consideration underlying this invention is that a lift fan in an aircraft wing normally requires a circular installation area and does not utilize a substantial portion of the area adjacent to the circle, which is then lost in terms of performance and thrust weight ratio. Therefore, the embodiments of FIGS. 1 through 4 are suggestive of different arrangements to provide optimum utilization of available installation area, as in the wings of an aircraft. It should also be noted that the grouped configurations contemplated in FIGS. 1 through 4 may take other forms, for example, the installation areas of lift engines can also be made elliptical or rhombic to provide any desired geometric configuration.

It is therefore apparent that in accordance with the present invention, any lift engine configuration utilized permits a building block system design in that lift power is increased by adding to present lift engines as suits the particular lift/thrust requirements and as is compatible with the available installation space. In addition, a damaged lift engine assembly can be replaced as a unit. Also as shown in the arrangement of FIG. 5, it would be practical to remove and replace a single gas turbine engine 8, if damaged, without disturbing lift fan 7 from its installed position. This is achieved by the structural arrangement of the present invention of disposing power units 8 as fully self-sufficient units at the circumference of the lift fan 7.

Obviously many modifications and variations of the present invention are possible in the light of the above teachings. It should therefore be understood that within the scope of the appended claims, the invention may be practiced otherwise than as specifically described.

I claim:

1. A lift engine assembly for aircraft comprising: lift fan means having tip turbine means and at least one gas turbine engine arranged at the circumference of said lift fan means, wherein said at least one gas turbine engine is positioned with its longitudinal axis of rotation parallel to the longitudinal axis of rotation of said lift fan means, wherein said gas turbine engine includes means for supplying air under pressure to said tip turbine means to drive said lift fan means, and wherein the exhaust gas flow of said at least one gas turbine engine is directed in the same direction as the exhaust air flow of said lift fan means for porviding additional lift.

2. A lift engine assembly as defined in claim 1 wherein said gas turbine engine means is a twin-spool gas turbine engine and includes a low pressure fan means providing a portion of the airflow therethrough to said tip turbine means of said lift fan means.

3. A lift engine assembly as defined in claim 2, wherein said gas turbine engine means further includes a high pressure compressor, said gas turbine engine means having an essentially radial flow through the blades of said low pressure fan means and said high pressure compressor.

4. A lift engine assembly as defined in claim 3, further including a spiral inlet duct connected between said gas turbine engine means and said lift fan means for transferring compressed air from said gas turbine engine means to said tip turbine means.

5. A lift engine assembly as defined in claim 1, wherein said gas turbine engine means includes a low pressure fan and a high pressure compressor for providing an essentially radial flow therethrough.

6. A lift engine assembly as defined in claim 5, including a spiral inlet duct connecting said gas turbine engine means and said lift fan means for transferring compressed air from the gas turbine engine to the tip turbine means of the lift fan means.

7. A lift engine assembly as defined in claim 2, including a spiral inlet duct connecting said gas turbine engine means and said lift fan means for transferring compressed air from the gas turbine engine means to the tip turbine means of the lift fan means.

8. A lift engine assembly as defined in claim 5, wherein portions of said spiral duct surrounds a portion of the circumference of said gas turbine engine means and a portion of the circumference of said lift fan means.

9. A lift engine assembly according to claim 1, wherein said at least one gas turbine engine includes a plurality of independently operable gas turbine engines spaced from one another around the circumference of said lift fan means.

10. A lift engine assembly according to claim 9, wherein said gas turbine engines are symmetrically positioned with respect to one another.

11. A lift engine assembly according to claim 1, wherein a plurality of lift fan means are provided which are spaced from one another and have parallel longitudinally extending axes of rotation.

12. A lift engine assembly according to claim 11, wherein said at least one gas turbine engine includes a plurality of independently operable gas turbine engines for each of said lift fan means.

13. A lift engine assembly according to claim 12, wherein said gas turbine engines are symmetrically positioned with respect to one another about each of the respective lift fan means.

14. A lift engine assembly according to claim 13, wherein said gas turbine engines are similar to one another.

15. A lift engine assembly according to claim 10, wherein said gas turbine engines are similar to one another.

16. A lift engine assembly according to claim 15, wherein four gas turbine engines are provided.

17. A lift engine assembly according to claim 15, wherein two gas turbine engines are provided.

18. A lift engine assembly according to claim 15, wherein three gas turbine engines are provided.

19. A lift engine assembly according to claim 13, wherein four gas turbine engines are provided for each lift fan means.

20. A lift engine assembly according to claim 13, wherein two gas turbine engines are provided for each lift fan means.

21. A lift engine assembly according to claim 13, wherein three gas turbine engines are provided for each lift fan means.

* * * * *